(12) United States Patent
Mann et al.

(10) Patent No.: US 8,473,431 B1
(45) Date of Patent: Jun. 25, 2013

(54) PREDICTIVE ANALYTIC MODELING PLATFORM

(75) Inventors: Gideon S. Mann, New York, NY (US); Jordan M. Breckenridge, Menlo Park, CA (US); Wei-Hao Lin, New York, NY (US)

(73) Assignee: Google Inc., Mountain View, CA (US)

( * ) Notice: Subject to any disclaimer, the term of this patent is extended or adjusted under 35 U.S.C. 154(b) by 43 days.

(21) Appl. No.: 12/782,689

(22) Filed: May 18, 2010

Related U.S. Application Data

(63) Continuation-in-part of application No. 12/780,751, filed on May 14, 2010.

(51) Int. Cl.
*G06F 15/18* (2006.01)
*G06G 7/02* (2006.01)

(52) U.S. Cl.
USPC .............................................. 706/12; 706/21

(58) Field of Classification Search
USPC .......................................................... 706/12
See application file for complete search history.

(56) References Cited

U.S. PATENT DOCUMENTS

| | | |
|---|---|---|
| 5,271,088 A | 12/1993 | Bahler |
| 5,583,968 A | 12/1996 | Trompf |
| 5,586,221 A | 12/1996 | Isik et al. |
| 5,727,128 A | 3/1998 | Morrison |
| 5,752,007 A | 5/1998 | Morrison |
| 5,862,513 A | 1/1999 | Mezzatesta et al. |
| 5,963,653 A | 10/1999 | McNary et al. |
| 6,003,003 A | 12/1999 | Asghar et al. |
| 6,038,528 A | 3/2000 | Mammone et al. |
| 6,042,548 A | 3/2000 | Giuffre |
| 6,092,919 A | 7/2000 | Calise et al. |
| 6,112,126 A | 8/2000 | Hales et al. |
| 6,202,049 B1 | 3/2001 | Kibre et al. |
| 6,243,696 B1 | 6/2001 | Keeler et al. |
| 6,498,993 B1 | 12/2002 | Chen et al. |
| 6,519,534 B2 | 2/2003 | Chen et al. |
| 6,687,696 B2 | 2/2004 | Hofmann et al. |
| 6,778,959 B1 | 8/2004 | Wu et al. |
| 6,845,357 B2 | 1/2005 | Shetty et al. |
| 6,879,971 B1 | 4/2005 | Keeler et al. |

(Continued)

OTHER PUBLICATIONS

Weiss, Integrating Real-time Predictive Analytics into SAP Applications [online], Dec. 30, 2009 [retrieved on Sep. 29, 2011]. Retrieved from the Internet<URL:http://www.sdn.sap.com/irj/scn/go/portal/prtroot/docs/library/uuid/a07faefd-61d7-2c10-bba6-89ac5ffc302c?QuickLink=index&overridelayout=true>.*

(Continued)

*Primary Examiner* — Jeffrey A Gaffin
*Assistant Examiner* — Nathan Brown, Jr.
(74) *Attorney, Agent, or Firm* — Fish & Richardson P.C.

(57) ABSTRACT

Methods, systems, and apparatus, including computer programs encoded on one or more computer storage devices, for training a predictive model. In one aspect, a method includes receiving over a network predictive modeling training data from a client computing system. The training data and multiple training functions obtained from a repository of training functions are used to train multiple predictive models. A score is generated for each of the trained predictive models, where each score represents an estimation of the effectiveness of the respective trained predictive model. A first trained predictive model is selected from among the trained predictive models based on the generated scores. Access to the first trained predictive model is provided over the network.

30 Claims, 4 Drawing Sheets

U.S. PATENT DOCUMENTS

| | | |
|---|---|---|
| 6,917,952 B1 | 7/2005 | Dailey et al. |
| 6,920,458 B1 | 7/2005 | Chu et al. |
| 6,941,301 B2 | 9/2005 | Ferguson et al. |
| 6,944,616 B2 | 9/2005 | Ferguson et al. |
| 7,003,403 B1 | 2/2006 | Dougherty et al. |
| 7,010,696 B1 | 3/2006 | Cambridge et al. |
| 7,020,642 B2 | 3/2006 | Ferguson et al. |
| 7,039,475 B2 | 5/2006 | Sayyarrodsari et al. |
| 7,054,847 B2 | 5/2006 | Hartman et al. |
| 7,124,054 B2 | 10/2006 | Kim et al. |
| 7,184,845 B2 | 2/2007 | Sayyarrodsari et al. |
| 7,194,395 B2 | 3/2007 | Genovese |
| 7,349,919 B2 | 3/2008 | Russell et al. |
| 7,461,048 B2 | 12/2008 | Teverovskiy et al. |
| 7,467,119 B2 | 12/2008 | Saidi et al. |
| 7,561,158 B2 | 7/2009 | Abe et al. |
| 7,565,304 B2 | 7/2009 | Casati et al. |
| 7,580,848 B2 | 8/2009 | Eder |
| 7,590,589 B2 | 9/2009 | Hoffberg |
| 7,599,749 B2 | 10/2009 | Sayyarrodsari et al. |
| 7,599,897 B2 | 10/2009 | Hartman et al. |
| 7,606,924 B2 | 10/2009 | Raz et al. |
| 7,643,989 B2 | 1/2010 | Deng et al. |
| 7,650,331 B1 | 1/2010 | Dean et al. |
| 7,668,740 B1 | 2/2010 | Baggett et al. |
| 7,689,520 B2 | 3/2010 | Burges et al. |
| 7,788,195 B1 | 8/2010 | Subramanian et al. |
| 7,813,870 B2 | 10/2010 | Downs et al. |
| 7,813,944 B1 | 10/2010 | Luk et al. |
| 7,818,318 B2 | 10/2010 | Berger et al. |
| 7,899,611 B2 | 3/2011 | Downs et al. |
| 7,912,628 B2 | 3/2011 | Chapman et al. |
| 7,912,773 B1 | 3/2011 | Subramanian et al. |
| 7,930,266 B2 | 4/2011 | Tuv et al. |
| 7,933,762 B2 | 4/2011 | Pinto et al. |
| 7,959,565 B2 | 6/2011 | Hamilton et al. |
| 7,963,916 B2 | 6/2011 | Hamilton et al. |
| 7,970,721 B2 | 6/2011 | Leskovec et al. |
| 7,979,365 B2 | 7/2011 | Goldberg et al. |
| 8,027,854 B2 | 9/2011 | Baggett et al. |
| 8,065,073 B2 | 11/2011 | Downs et al. |
| 8,065,659 B1 | 11/2011 | Prince et al. |
| 8,090,524 B2 | 1/2012 | Chapman et al. |
| 8,112,417 B2 | 2/2012 | Berger et al. |
| 8,185,486 B2 | 5/2012 | Eder |
| 8,244,654 B1 | 8/2012 | Hobgood et al. |
| 2002/0099730 A1 | 7/2002 | Brown et al. |
| 2003/0088412 A1 | 5/2003 | Shetty et al. |
| 2003/0145000 A1 | 7/2003 | Arning et al. |
| 2003/0212851 A1 | 11/2003 | Drescher et al. |
| 2004/0009536 A1 | 1/2004 | Grass et al. |
| 2004/0117040 A1 | 6/2004 | Sayyarrodsari et al. |
| 2004/0130276 A1 | 7/2004 | Sayyarrodsari et al. |
| 2005/0125474 A1 | 6/2005 | Pednault |
| 2005/0234753 A1 | 10/2005 | Pinto et al. |
| 2006/0173906 A1 | 8/2006 | Chu et al. |
| 2007/0005311 A1 | 1/2007 | Wegerich et al. |
| 2007/0150424 A1 | 6/2007 | Igelnik |
| 2008/0097937 A1 | 4/2008 | Hadjarian |
| 2008/0154821 A1 | 6/2008 | Poulin |
| 2008/0270363 A1 | 10/2008 | Hunt et al. |
| 2008/0288209 A1 | 11/2008 | Hunt et al. |
| 2008/0288889 A1 | 11/2008 | Hunt et al. |
| 2008/0294372 A1 | 11/2008 | Hunt et al. |
| 2008/0294996 A1 | 11/2008 | Hunt et al. |
| 2008/0319829 A1 | 12/2008 | Hunt et al. |
| 2009/0006156 A1 | 1/2009 | Hunt et al. |
| 2009/0018996 A1 | 1/2009 | Hunt et al. |
| 2009/0024546 A1 | 1/2009 | Ficcaglia et al. |
| 2009/0106178 A1 | 4/2009 | Chu |
| 2009/0132448 A1 | 5/2009 | Eder |
| 2009/0157571 A1 | 6/2009 | Smith et al. |
| 2009/0177450 A1 | 7/2009 | Gray et al. |
| 2010/0049538 A1 | 2/2010 | Frazer et al. |
| 2010/0100826 A1 | 4/2010 | Hawthorne et al. |
| 2010/0293175 A1 | 11/2010 | Vadrevu et al. |
| 2011/0145175 A1 | 6/2011 | Agarwal |
| 2011/0202487 A1 | 8/2011 | Koshinaka |
| 2011/0251945 A1 | 10/2011 | Liao et al. |
| 2011/0289025 A1 | 11/2011 | Yan et al. |
| 2011/0313900 A1 | 12/2011 | Falkenborg et al. |

OTHER PUBLICATIONS

Uclassify web pages, 16 pages [online] [retrieved on May 18, 2010]. Retrieved from the Internet: <URL: http://www.uclassify.com/>.

R-Project web pages, 190 pages [online] [retrieved on May 18, 2010]. Retrieved from the Internet: <URL: http://www.r-project.org/>. 190 pages.

Zementis web pages, 34 pages [online] [retrieved on May 18, 2010]. Retrieved from the Internet: <URL: http://www.zementis.com/>.

Duchi, John, et al., "Boosting with Structural Sparsity", 2009, cs.berkeley.edu [online]. [Retrieved on Nov. 25, 2011]. Retrieved from the Internet: <URL: http://www.cs.berkeley.edu/~jduchi/projects/DuchiSi09d.pdf>, 41 pages.

Duchi, John, et al., "Boosting with Structural Sparsity", Proceedings of the 26th International Conference on Machine Learning, Montreal, Canada, 2009, cs.berkeley.edu [online]. [Retrieved on Nov. 25, 2011]. Retrieved from the Internet: <URL: http://www.cs.berkeley.edu/~jduchi/projects/DuchiSi09a.pdf>, 8 pages.

Chandra, Tushar, "Sibyl: a system for large scale machine learning" Keynote I PowerPoint presentation, Jul. 28, 2010, ladisworkshop.org [online]. [Retrieved on Jan. 25, 2011]. Retrieved from the Internet: <URL: http://ladisworkshop.org/sites/default/files/LADIS%202010%20actual.pdf>, 43 pages.

PMML 4.0 General Structure of a PMML Document, [online] [Retrieved on May 1, 2011]. Retrieved from the Internet: <URL: dmg.org/v4-0-1/General Structure.html>, 9 pages.

Predictive Model Markup Language, [online] [Retrieved on May 1, 2011], Retrieved from the Internet: <URL:http://en.wikipedia.org/wiki/Predictive_Model_Markup_Language>, 7 pages.

Developer's Guide—Google Prediction, [online] [Retrieved on May 6, 2011], Retrieved from the Internet: ,URL: http:www.google.com/ .../developer-guide.htm>, 7 pages.

Makhtar, Mokhairi, et al., "Predictive Model Representation and Comparison: Towards Data and Predictive Models Governance", Computational Intelligence (UKCI), 2010 UK Workshop: Sep. 8-10, 2010; 6 pages.

Netuitive Announces Amazon EC2 Integration for Hybrid Cloud Performance Management [online] [retrieved on Apr. 26, 2011], Retrieved from the Internet: <URL: marketwire.com/.../Netuitive-Announc...>, 2 pages.

Google Apps Script Overview [online] [retrieved on May 6, 2011], Retrieved from the Internet: <URL: code.google.com/.../guide.html>, 4 pages.

"Google Prediction API (Labs)", Google.com, [Retrieved on May 4, 2011]. Retrieved from the Internet: <URL: http://code.google.com/apis/predict/>, 1 page.

Creative Commons Attribution-Share Alike 3.0 Unported, Cross-validation (statistics)., http://creativecommons.org., pp. 1-5.

Creative Commons Attribution-Share Alike 3.0 Unported, Winnow (algorithm)., http://creativecommons.org., 2 pages.

Bengio, Yoshua, Continuous Optimization of Hyper-Parameters, C.P. 6128 Succ. Centre-Ville, Montreal, Quebec, Canada, H3C 3J7, 7 pages.

Daelemans, Walter et al., Combined Optimization of Feature Selection and Algorithm Parameters in Machine Learning of Language, CNTS Language Technology Group, University of Antwerp, Universiteitsplein 1, B-2610 Antwerpen, Postdoctoral research of the Fund for Scientific Research, Flanders, Belgium, 12 pages.

C.E. Rasmussen & C.K.I. Williams, Gaussian Processes for Machine Learning, Model Selection and Adaptation of Hyperparameters, Chapter 5, the MIT Press, 2006 Massachusetts Institute of Technology. [Retrieved from the Internet on Oct. 18, 2011]. Retrieved from the Internet: <URL: http://www.gaussianprocess.org/gpml/chapters/RW5.pdf, 24 pages.

R. Duin, "The Combining Classifer: To Train or Not to Train?", IEEE Pattern Recognition, 2002 Proceedings, 16 International Conference, pp. 765-770.

L. Denoyer et al., "Structured Multimedia Document Classification", ACM DocEng '03, Nov. 20-22, 2003, pp. 153-160.

J. Platt et a., "Large Margin DAGs for Multiclass Classification", in Advances in Neural Information Processing Systems, S.A. Solla et al., eds., MIT Press 2000, pp. 1-7.
Potrera, Cosmin Marian, et al.; DCFMS: "A chunk-based distributed file system for supporting multimedia communication", Computer Science and Information (FedCSIS), 2011 Federated Conference on Publication Year: 2011, pp. 737-741.
McDermott, et al.: "Generating models of mental retardation from data with machine learning"; Knowledge and Data Engineering Exchange Workshop, 1997. Proceedings Digital Object Identifier: 10,1109/KDEX.1997.629850 Publication Year: 1997, pp. 114-119.
English, et al.; "A grammatical approach to reducing the statistical sparsity of language models in natural domains", Acoustics, Speech, and Signal Processing, IEEE International Conference of ICASSO'86, vol. 11, Digital Object Identifier: 10.1109/CASSO. 1986.1168955 Publication Year: 1986, pp. 1141-1144.
Altincay, et al.; Post-processing of Classifier Outputs in Multiple Classifier Systems:, 2002; Springer-Verlag Berlin Heidelberg; Lecture Notes in Computer Science, 2002, vol. 2364; pp. 159-168.
Altincay, et al.: "Why Does Output Normalization Create Problems in Multiple Classifier Systems?" 2002; IEEE; 16th International Conference on Pattern Recognition, Proceedings; vol. 2; pp. 775-778.
Stemmer, Georg et al.; "Comparison and Combination of Confidence Measures"; 2006; Springer-Vergal Berlin Heidelbreg; Lecture Notes in Computer Science 2006, vol. 2448; pp. 181-188.
Altincay, et al., "Undesirable Effects of Output Normalization in Multiple Classifier Systems", 2002; Elsevier Science B.V.; Pattern Recognition Letters 24 (2003); pp. 1163-1170.
Delany, et al., Generating Estimates of Classifcation Confidence for a Case-Based Spam Filter'; 2005; Springer-Vergal Berlin Heidelberg; Lecture Notes in Computer Science, 2005, vol. 3620, pp. 177-190.
Dag Consistent Parallel Simpulation: A Predictable and Robust Conservative Algorithm, Wenton Cai et al.; Parallel and Distributed Simulation, 1997; Proceedings, 11th Workshop on Digital Object Identifier; 10.1109/PADS.1997.594604; pp. 178-181.
Stochastic Models for the Web Graph, Kumar, R. et al.; Foundations of Computer Science, 2000; Proceedings, 41st Annual Symposium on Digital Object Identifier; 11.1109/SFCS.2000.892065; pp. 57-65.
Explicit Modeling of Mode Transition Constraints for Model Predictive Control, Kobayashi, K. et al.; SICE Annual Conference, 2008 Digital Object Identifier: 10.1109/SICE.2008.4654911; pp. 1569-1574.
Research on Prediction Technique of Network Situation Awareness, Wang, et al.; Cybernetics and Intelligent Systems, 2008 IEEE Conference on Digital Object Identifier: 10.1109/ICCIS.2008.4670783; pp. 570-574.
T. Dietterich, Ensemble Methods in Machine Learning:, J. Kittler and F. Foli (Eds.), MCS 2000, pp. 1-15.
Predictive Dynamix Inc., Predictive Modeling Technology, Predictive Dynamix, Inc., 2003-2004, 5 pages.
Duin, P.W. Robert, et al., Experiments with Classifier Combining Rules, J. Kittler and F. Foli (Eds.): MCS 2000, LNCS 1857, pp. 16-29, 14 pages.
Barbieri, Maddalena Maria, et al., Optimal Predictive Model Selection, The Annals of Statistics, 2004, vol. 32, No. 3, 29 pages.
Yuan, Zheng et al., Combining Linear Progression Models: When and How? Dec. 2004, 27 pages.
Evaluating Predictive Models, 36-350, Data Mining, Principles of Data Mining, Chapter 7; Berk chapter 2, Oct. 26 and 28, 2001, 22 pages.
Hutter, et al., "Performance Prediction and Automated Tuning of Randomized and Parametric Algorithms,", Principles and Practice of Constraint Programing, Lecture Notes in Computer Science, 2006, 15 pages.
SAS Rapid Predictive Modeler, Overview, 2010, 4 pages.
Postema, et al., "A Decision Support Tool for Tuning Parameters in a Machine Learning Algorithm", Nanyang Techonological University, 1997, 9 pages.
"Active learning (machine learning)," Wikipedia, the free encyclopedia, [online] [retrieved on Sep. 8, 2011]. Retrieved from the Internet: http://en.wikipedia.org/wiki/Active learning (machine learning), 3 pages.
U.S. Appl. No. 13/481,196, filed May 29, 2012, Lin et al., Predictive Model Importation.
U.S. Appl. No. 13/486,217, filed Jun. 1, 2012, Lin et al., Predictive Model Application Programming Interface.
S.B. Kotsiantis: "An incremental ensemble of classifiers", Artificial Intelligence Review, vol. 36, No. 4, Mar. 11, 2011, pp. 249-266.
S.B. Kotsiantis, et al.: Machine learning: A review of classification and combining techniques: Artificial Intelligence Review, vol. 26, No. 3, Nov. 10, 2007, pp. 159-190.
Google: "Google prediction API: Prediction v1.2 reference", Google Developers, 2012, retrieved from the Internet: URL: https://developers.google.com/prediction/docs/reference/v1.2/reference [retrieved on Jul. 27, 2012].
T. Green, et al.: "Prediction API: Every app a smart app", Google Developers Blog, Apr. 21, 2011, Retrieved from the Internet: URL:http//googledevelopers.blogspot.n1/2p/11/04/prediction-api-every-app-smart-app.html [retrieved on Jul. 27, 2012].
S. Reed, et al.: "Cross-validation support? And replies", Google Group prediction-api-discuss, Jun. 14, 2010, Retrieved from the Internet: URL:https://groups.google.com/group/prediction-api-discuss/ [retrieved on May 22, 2010].
Google: "Google prediction API", Google Code, 2012, retrieved from the Internet: URL: http://code.google.com/apis/predict/ [retrieved on May 22, 2010].
C.D. Manning, et al.: "8.3 Evaluation of unranked retrieval sets", Introduction to Information Retrieval (online edition), Apr. 7, 2009, retrieved from the Internet: URL:http://nlp.stanford.edu/IR-book/html/htmledition/evaluation-of-unranked-retrieval-sets-1.html [retrieved on Jul. 27, 2012].
International Search Report and Written Opinion for PCT Application Serial No. PCT/US2012/035978, search report completed Jul. 31, 2012, mailed Aug. 8, 2012, 93 pages.
U.S. Appl. No. 13/544,942, filed Jul. 20, 2012, Mann et al., Predictive Analytic Modeling Platform.
U.S. Appl. No. 13/554,942, filed Jul. 20, 2012, Mann et al., Predictive Analytic Modeling Platform.

* cited by examiner

PREDICTIVE ANALYTIC MODELING PLATFORM

CROSS-REFERENCE TO RELATED APPLICATION

This application is a continuation-in-part of pending U.S. application Ser. No. 12/780,751, entitled "Predictive Analytic Modeling Platform", filed on May 14, 2010, by Gideon Mann et al, the entire contents of which application is incorporated herein by reference.

TECHNICAL FIELD

This specification relates to training and selecting a predictive model.

BACKGROUND

Predictive analytics generally refers to techniques for extracting information from data to build a model that can predict an output from a given input. Predicting an output can include predicting future trends or behavior patterns, or performing sentiment analysis, to name a few examples. Various types of predictive models can be used to analyze data and generate predictive outputs. Typically, a predictive model is trained with training data that includes input data and output data that mirror the form of input data that will be entered into the predictive model and the desired predictive output, respectively. The amount of training data that may be required to train a predictive model can be large, e.g., in the order of gigabytes or terabytes. The number of different types of predictive models available is extensive, and different models behave differently depending on the type of input data. Additionally, a particular type of predictive model can be made to behave differently, for example, by adjusting the hyper-parameters or via feature induction or selection.

SUMMARY

In general, one innovative aspect of the subject matter described in this specification can be embodied in methods that include the actions of receiving over a network predictive modeling training data from a client computing system. The training data and multiple training functions obtained from a repository of training functions are used to train multiple predictive models. A score is generated for each of the trained predictive models, where each score represents an estimation of the effectiveness of the respective trained predictive model. A first trained predictive model is selected from among the trained predictive models based on the generated scores. Access to the first trained predictive model is provided over the network. Other embodiments of this aspect include corresponding systems, apparatus, and computer programs, configured to perform the actions of the methods, encoded on computer storage devices.

These and other embodiments can each optionally include one or more of the following features. Using the training data to train each of the predictive models and generating a score for each of the trained predictive models can include partitioning the training data into k partitions, performing k-fold cross-validation and generating a cross-validation score for each of the trained predictive models that indicates the accuracy of the trained predictive model, where k is an integer greater than 1. Providing access to the first trained predictive model can include providing access to the first trained predictive model trained with all k partitions of the training data. Input data, data identifying the first trained predictive model, and a request for a predictive output can be received. In response, the predictive output can be generated using the first predictive model and the input data. The multiple training functions can include two or more training functions for training predictive models of a same type, where each predictive model is trained with a different training function. The multiple training functions can include two or more training functions for training predictive models of a same type, where each predictive model is trained with a different hyper-parameter configuration.

Providing access to the first trained predictive model can include providing a universal resource locator (URL) that identifies the first trained predictive model as an addressable resource. A training request can be received over the network over an HTTP connection at a universal resource locator (URL) address.

Generating a score for each of the trained predictive models can include generating an estimate of resource usage costs for each of the trained predictive models and generating the score based at least in part on the estimates. The training data includes at least a gigabyte of training data. In another example, the training data includes at least a terabyte of training data. The multiple trained predictive models can include (without limitation) a Naïve Bayes model, a Perceptron model, a Support Vector Machine model, a linear regression model, a logistic regression model, and/or a k-nearest neighbor model.

In general, another aspect of the subject matter described in this specification can be embodied in methods that include the actions of uploading predictive modeling training data over a network to a server system. An address to access a trained predictive model trained using the training data and selected from multiple predictive models based on an estimation of an effectiveness of each of the trained predictive models in modeling the training data is received from the server system. Input data and a request for a predictive output is sent to the address to access the trained predictive model. In response to the request, the predictive output generated by the trained predictive model based on the input data is received. Other embodiments of this aspect include corresponding systems, apparatus, and computer programs, configured to perform the actions of the methods, encoded on computer storage devices.

In general, another aspect of the subject matter described in this specification can be embodied in methods that include the actions of receiving over a network multiple sets of predictive modeling training data from a first set of multiple client computing systems. For each set of predictive modeling training data, the training data and multiple training functions obtained from the repository are used to train multiple predictive models. A score is generated for each of the trained predictive models, where each score represents an estimation of the effectiveness of the respective trained predictive model. A trained predictive model is selected from among the multiple trained predictive models based on the generated scores. Multiple trained predictive models are thereby generated. Access to the multiple trained predictive models is provided to a second set of multiple client computing systems. Other embodiments of this aspect include corresponding systems, apparatus, and computer programs, configured to perform the actions of the methods, encoded on computer storage devices.

These and other embodiments can each optionally include the following feature. Data can be received from a first client computing system included in the first set of multiple client computing systems indicating that permission is granted to a second client computing system included in the second set of multiple client computing systems for the second client computing system to access the trained predictive model that was trained using training data received from the first client computing system.

Particular embodiments of the subject matter described in this specification can be implemented so as to realize one or more of the following advantages. A predictive model can be selected for a client computing system based on an exploration of multiple different predictive models. An optimal type of predictive model for the particular type of input data that will be supplied by the client computing system can thereby be selected. The training, selection, and prediction operations can occur remote from the client computing system, i.e., over a network (or "in the cloud"), and therefore can be performed in a way that avoids expending client-side resources, both computing resources and human resources. Large volumes of training data can be used to train a predictive model, for example, in the order of gigabytes or terabytes. Access to the trained predictive model can be integrated into a client's application, for example, a web-based application. Requests to the trained predictive model for a predictive output can be automated within the client's web-based application. A predictive modeling server system that performs the training, selection and prediction operations remote from the client computing system can from time to time, or continually, update the server system and improve the training, selection and/or prediction operations. For example, new training functions, hyper-parameter searching, feature induction or selection procedures can be applied to existing training data sets to provide improved models for existing training data. The client computing system (or another computing platform) can thereby be provided with access to an improved trained predictive model, without any additional client-side expenditure of resources. Additional sources of knowledge (e.g. similar training data) can be integrated into training without additional client-side support.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
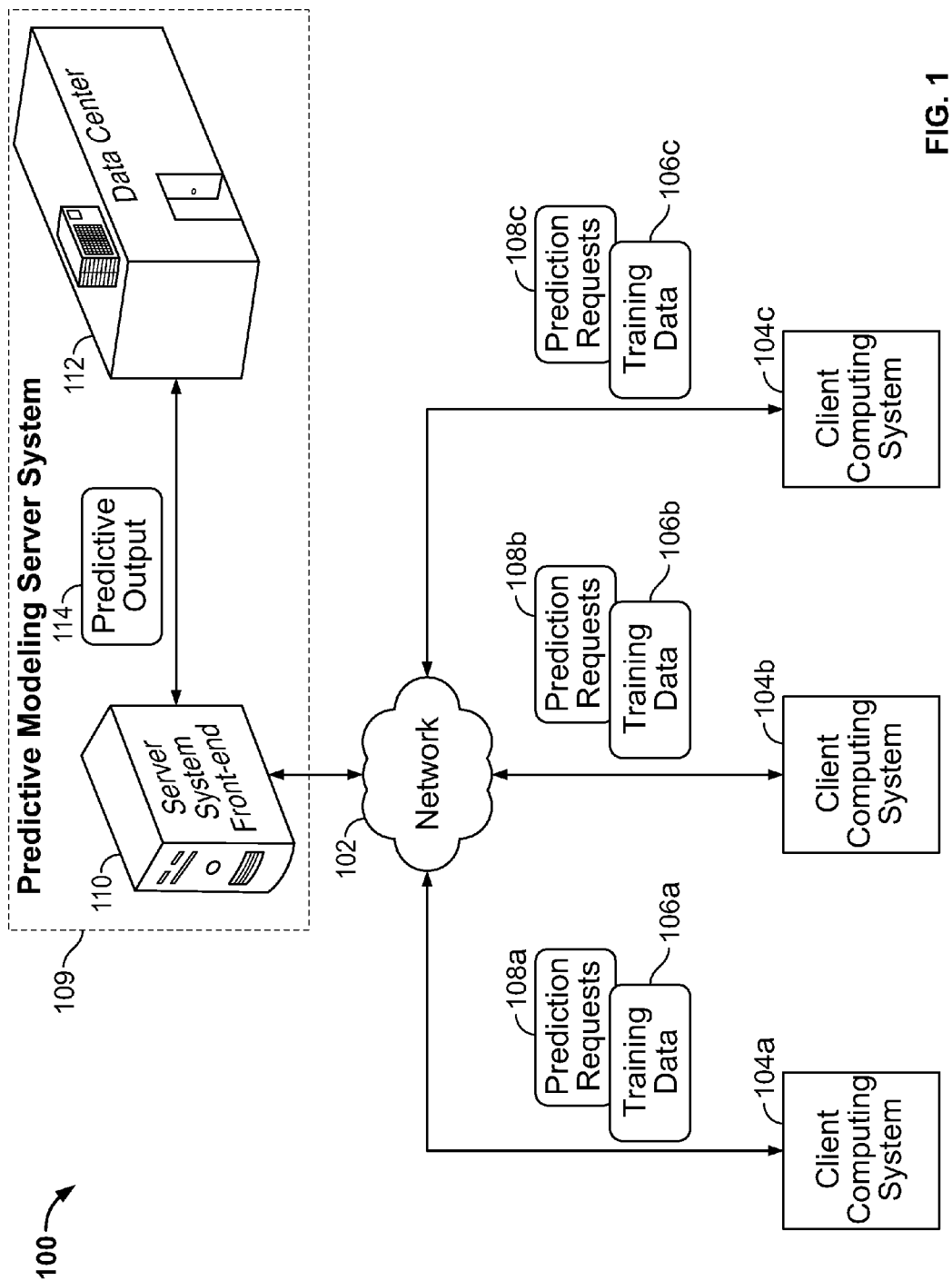
FIG. 1 is a schematic representation of a system that provides a predictive analytic platform.

FIG. 1 is a schematic representation of a system that provides a predictive analytic platform. The system 100 includes multiple client computing systems 104a-c that can communicate with a predictive modeling server system 109. In the example shown, the client computing systems 104a-c can communicate with a server system front end 110 by way of a network 102. The network 102 can include one or more local area networks (LANs), a wide area network (WAN), such as the Internet, a wireless network, such as a cellular network, or a combination of all of the above. The server system front end 110 is in communication with, or is included within, one or more data centers, represented by the data center 112. A data center 112 generally is a large numbers of computers, housed in one or more buildings, that are typically capable of managing large volumes of data.

A client entity—an individual or a group of people or a company, for example—may desire a trained predictive model that can receive input data from a client computing system 104a belonging to or under the control of the client entity and generate a predictive output. To train a particular predictive model can require a significant volume of training data, for example, one or more gigabytes of data. The client computing system 104a may be unable to efficiently manage such a large volume of data. Further, selecting and tuning an effective predictive model from the variety of available types of models can require skill and expertise that an operator of the client computing system 104a may not possess.

The system 100 described here allows training data 106a to be uploaded from the client computing system 104a to the predictive modeling server system 109 over the network 102. The server system front end 110 can receive, store and manage large volumes of data using the data center 112. One or more computers in the data center 112 can run software that uses the training data to estimate the effectiveness of multiple types of predictive models and make a selection of a trained predictive model to be used for data received from the particular client computing system 104a. The selected model can be trained and the trained model made available to users who have access to the predictive modeling server system 109 and, optionally, permission from the client entity that provided the training data for the model. Access and permission can be controlled using any conventional techniques for user authorization and authentication and for access control, if restricting access to the model is desired. The client computing system 104a can transmit prediction requests 108a over the network. The selected trained model executing in the data center 112 receives the prediction request, input data and request for a predictive output, and generates the predictive output 114. The predictive output 114 can be provided to the client computing system 104a, for example, over the network 102.

Advantageously, when handling large volumes of training data and/or input data, the processes can be scaled across multiple computers at the data center 112. The predictive modeling server system 109 can automatically provision and allocate the required resources, using one or more computers as required. An operator of the client computing system 104a is not required to have any special skill or knowledge about predictive models. The training and selection of a predictive model can occur "in the cloud", i.e., over the network 102, thereby lessening the burden on the client computing system's processor capabilities and data storage, and also reducing the required client-side human resources.

The term client computing system is used in this description to refer to one or more computers, which may be at one or more physical locations, that can access the predictive modeling server system.

The data center 112 is capable of handling large volumes of data, e.g., on the scale of terabytes or larger, and as such can serve multiple client computing systems. For illustrative purposes, three client computing systems 104a-c are shown, however, scores of client computing systems can be served by such a predictive modeling server system 109.

Figure 2:
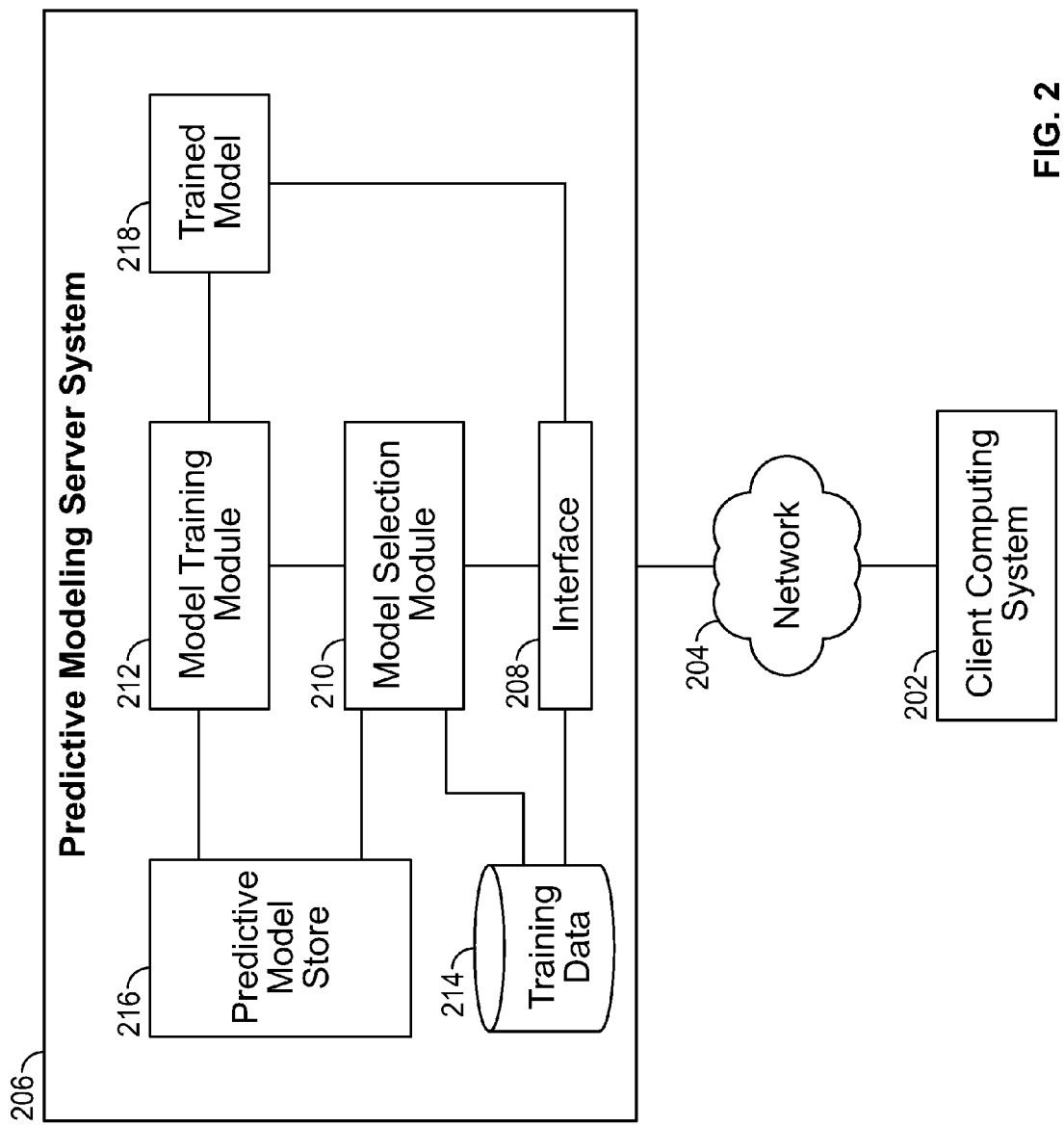
FIG. 2 is a schematic block diagram showing a system for providing a predictive analytic platform over a network.

FIG. 2 is a schematic block diagram showing a system 200 for providing a predictive analytic platform over a network.

For illustrative purposes, the system 200 is shown with one client computing system 202 communicating over a network 204 with a predictive modeling server system 206. However, it should be understood that the predictive modeling server system 206, which can be implemented using multiple computers that can be located in one or more physical locations, can serve multiple client computing systems. In the example shown, the predictive modeling server system includes an interface 208. In some implementations the interface 208 can be implemented as one or more modules adapted to interface with components included in the predictive modeling server system 206 and the network 204, for example, the training data store 214, the model selection module 210 and/or the trained model 218.

Figure 3:
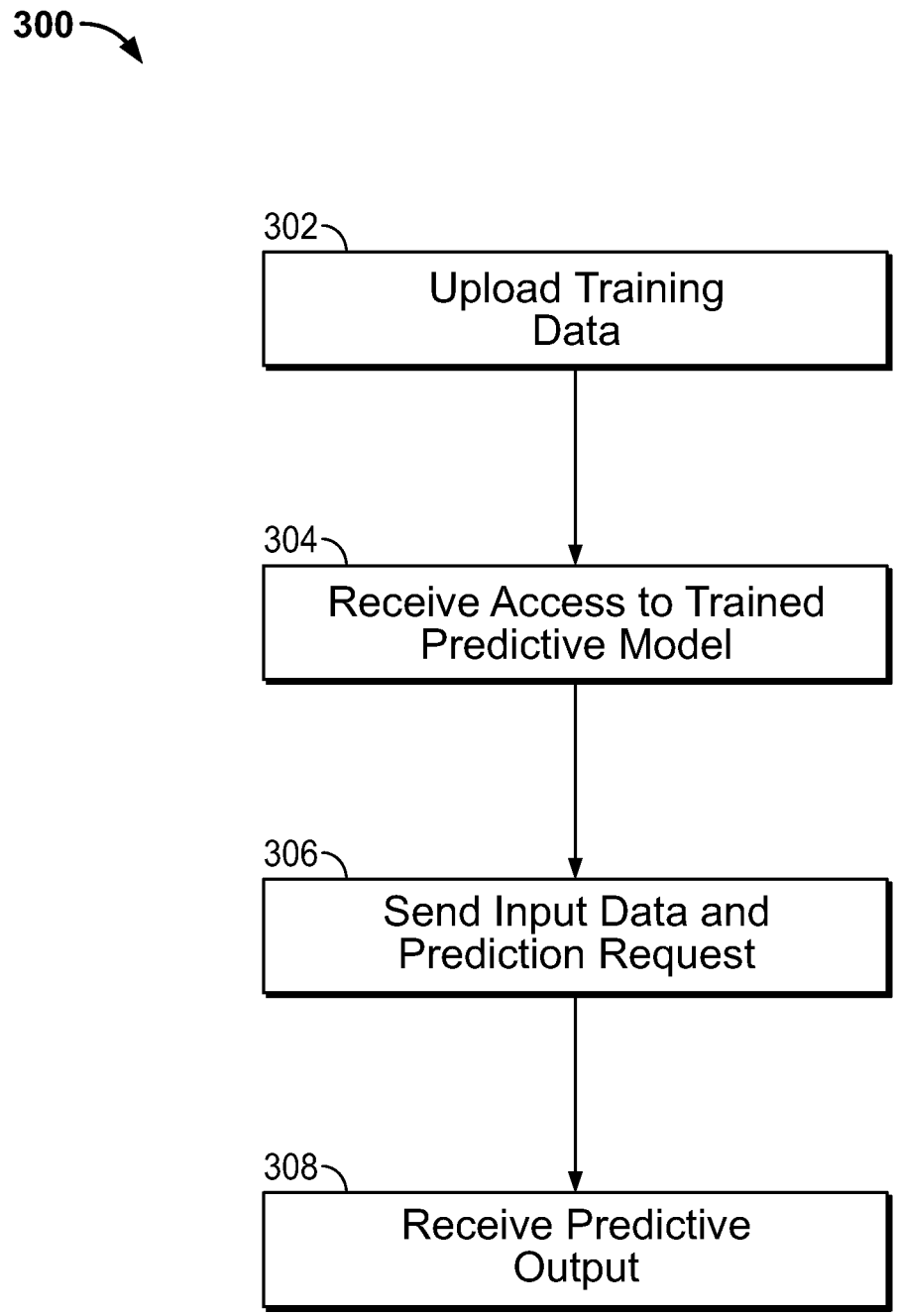
FIG. 3 is a flowchart showing an example process for using the predictive analytic platform from the perspective of the client computing system.

FIG. 3 is a flowchart showing an example process 300 for using the predictive analytic platform from the perspective of the client computing system 202. The client computing system 202 uploads training data to the predictive modeling server system 206 over the network 204 (Step 302). In response, the client computing system 202 receives access to a trained predictive model, for example, trained model 218 (Step 304). In the implementations shown, the trained model 218 is not itself provided. The trained model 218 resides and executes at a location remote from the client computing system 202. For example, referring back to FIG. 1, the trained model 218 can reside and execute in the data center 112, thereby not using the resources of the client computing system 202. Once the client computing system 202 has access to the trained model 218, the client computing system can send input data and a prediction request to the trained model (Step 306). In response, the client computing system receives a predictive output generated by the trained model from the input data (Step 308).

From the perspective of the client computing system 202, training and use of a predictive model is relatively simple. The training and selection of the predictive model, tuning of the hyper-parameters and features used by the model (to be described below) and execution of the trained predictive model to generate predictive outputs is all done remote from the client computing system 202 without expending client computing system resources. The amount of training data provided can be relatively large, e.g., gigabytes or more, which is often an unwieldy volume of data for a client.

Figure 4:
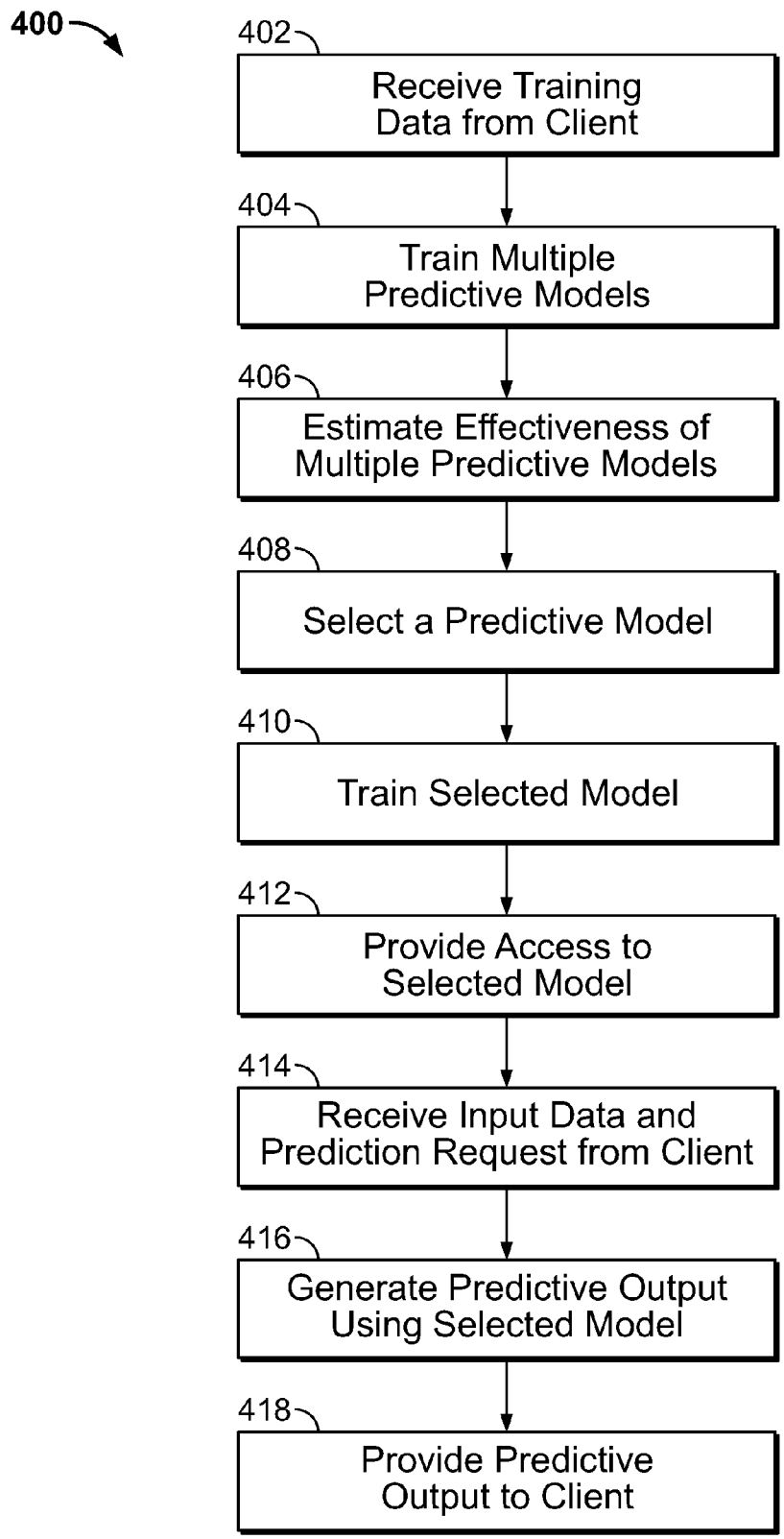
FIG. 4 is a flowchart showing an example process for serving a client computing system using the predictive analytic platform.

The predictive modeling server system 206 will now be described in more detail with reference to the flowchart shown in FIG. 4. FIG. 4 is a flowchart showing an example process for serving a client computing system using the predictive analytic platform. Training data is received from the client computing system (Step 402). For example, the client computing system 202 can upload the training data to the predictive modeling server system 206 over the network 204. The training data can be in any convenient form that is understood by the modeling server system 206 to define a set of records, where each record includes an input and a corresponding desired output. By way of example, the training data can be provided using a comma-separated value format, or a sparse vector format. In another example, the client computing system 202 can specify a protocol buffer definition and upload training data that complies with the specified definition.

The process 400 and system 200 can be used in various different applications. Some examples include (without limitation) making predictions relating to customer sentiment, transaction risk, species identification, message routing, diagnostics, churn prediction, legal docket classification, suspicious activity, work roster assignment, inappropriate content, product recommendation, political bias, uplift marketing, e-mail filtering and career counseling. For illustrative purposes, the process 400 and system 200 will be described using an example that is typical of how predictive analytics are often used. In this example, the client computing system 202 provides a web-based online shopping service. The training data includes multiple records, where each record provides the online shopping transaction history for a particular customer. The record for a customer includes the dates the customer made a purchase and identifies the item or items purchased on each date. The client computing system 202 is interested in predicting a next purchase of a customer based on the customer's online shopping transaction history.

Various techniques can be used to upload a training request and the training data from the client computing system 202 to the predictive modeling server system 206. In some implementations, the training data is uploaded using an HTTP web service. The client computing system 202 can access storage objects using a RESTful API to upload and to store their training data on the predictive modeling server system 206. In other implementations, the training data is uploaded using a hosted execution platform, e.g., AppEngine available from Google Inc. of Mountain View, Calif. The predictive modeling server system 206 can provide utility software that can be used by the client computing system 202 to upload the data. In some implementations, the predictive modeling server system 206 can be made accessible from many platforms, including platforms affiliated with the predictive modeling server system 206, e.g., for a system affiliated with Google, the platform could be a Google App Engine or Apps Script (e.g., from Google Spreadsheet), and platforms entirely independent of the predictive modeling server system 206, e.g., a desktop application. The training data can be large, e.g., many gigabytes. The predictive modeling server system 206 can include a data store, e.g., the training data store 214, operable to store the received training data.

The predictive modeling server system 206 includes a repository of training functions for various predictive models, which in the example shown are included in the predictive model store 216. Some examples of types of predictive models include (without limitation) regression models (e.g., linear regression, logistic regression), classification and regression tree models, multivariate adaptive regression spline models and other machine learning models (e.g., Naïve Bayes, k-nearest neighbors, Support Vector Machines, Perceptron). Multiple predictive models, which can be all or a subset of the available predictive models, are trained using some or all of the training data (Step 404). In the example predictive modeling server system 206, a model training module 212 is operable to train the multiple predictive models.

The client computing system 202 can send a training request to the predictive modeling server system 206 to initiate the training of a model. For example, a GET or a POST request could be used to make a training request to a URL. A training function is applied to the training data to generate a set of parameters. These parameters form the trained predictive model. For example, to train (or estimate) a Naïve Bayes model, the method of maximum likelihood can be used. A given type of predictive model can have more than one training function. For example, if the type of predictive model is a linear regression model, more than one different training function for a linear regression model can be used with the same training data to generate more than one trained predictive model.

For a given training function, multiple different hyper-parameter configurations can be applied to the training function, again generating multiple different trained predictive models. Therefore, in the present example, where the type of predictive model is a linear regression model, changes to an L1 penalty generate different sets of parameters. Additionally, a predictive model can be trained with different features, again generating different trained models. The selection of features, i.e., feature induction, can occur during multiple iterations of computing the training function over the training data. For example, feature conjunction can be estimated in a forward stepwise fashion in a parallel distributed way enabled by the computing capacity of the predictive modeling server system, i.e., the data center.

Considering the many different types of predictive models that are available, and then that each type of predictive model may have multiple training functions and that multiple hyper-parameter configurations and selected features may be used for each of the multiple training functions, there are many different trained predictive models that can be generated. Depending on the nature of the input data to be used by the trained predictive model to predict an output, different trained predictive models perform differently. That is, some can be more effective than others.

The effectiveness of each of the trained predictive models is estimated (Step 406). For example, a model selection module 214 is operable to estimate the effectiveness of each trained predictive model. In some implementations, cross-validation is used to estimate the effectiveness of each trained predictive model. In a particular example, a 10-fold cross-validation technique is used. Cross-validation is a technique where the training data is partitioned into sub-samples. A number of the sub-samples are used to train an untrained predictive model, and a number of the sub-samples (usually one) is used to test the trained predictive model. Multiple rounds of cross-validation can be performed using different sub-samples for the training sample and for the test sample. K-fold cross-validation refers to portioning the training data into K sub-samples. One of the sub-samples is retained as the test sample, and the remaining K-1 sub-samples are used as the training sample. K rounds of cross-validation are performed, using a different one of the sub-samples as the test sample for each round. The results from the K rounds can then be averaged, or otherwise combined, to produce a cross-validation score. 10-fold cross-validation is commonly used.

In some implementations, the effectiveness of each trained predictive model is estimated by performing cross-validation to generate a cross-validation score that is indicative of the accuracy of the trained predictive model, i.e., the number of exact matches of output data predicted by the trained model when compared to the output data included in the test sub-sample. In other implementations, one or more different metrics can be used to estimate the effectiveness of the trained model. For example, cross-validation results can be used to indicate whether the trained predictive model generated more false positive results than true positives and ignores any false negatives.

In other implementations, techniques other than, or in addition to, cross-validation can be used to estimate the effectiveness. In one example, the resource usage costs for using the trained model can be estimated and can be used as a factor to estimate the effectiveness of the trained model.

In some implementations, the predictive modeling server system 206 operates independently from the client computing system 202 and selects and provides the trained model 218 as a specialized service. The expenditure of both computing resources and human resources and expertise to select the untrained predictive models to include in the predictive model store 216, the training functions to use for the various types of available predictive models, the hyper-parameter configurations to apply to the training functions and the feature-inductors all occurs server-side. Once these selections have been completed, the training and model selection can occur in an automated fashion with little or no human intervention, unless changes to the server system 206 are desired. The client computing system 202 thereby benefits from access to a trained model 318 that otherwise might not have been available to the client computing system 202, due to limitations on client-side resources.

Referring again to FIG. 4, each trained model is assigned a score that represents the effectiveness of the trained model. As discussed above, the criteria used to estimate effectiveness can vary. In the example implementation described, the criterion is the accuracy of the trained model and is estimated using a cross-validation score. Based on the scores, a trained predictive model is selected (Step 408). In some implementations, the trained models are ranked based on the value of their respective scores, and the top ranking trained model is chosen as the selected predictive model. Although the selected predictive model was trained during the evaluation stage described above, training at that stage may have involved only a sample of the training data, or not all of the training data at one time. For example, if k-fold cross-validation was used to estimate the effectiveness of the trained model, then the model was not trained with all of the training data at one time, but rather only K-1 partitions of the training data. Accordingly, if necessary, the selected predictive model is fully trained using the training data (e.g., all K partitions) (Step 410), for example, by the model training module 212. A trained model (i.e., "fully trained" model) is thereby generated for use in generating predictive output, e.g., trained model 218. The trained model 218 can be stored by the predictive modeling server system 206. That is, the trained model 218 can reside and execute in a data center that is remote from the client computing system 202.

Access to the trained model is provided (Step 412) rather than the trained model itself. In some implementations, providing access to the trained model includes providing an address to the client computing system 202 or other user computing platform that can be used to access the trained model; for example, the address can be a URL (Universal Resource Locator). Access to the trained model can be limited to authorized users. For example, a user may be required to enter a user name and password that has been associated with an authorized user before the user can access the trained model from a computing system, including the client computing system 202. If the client computing system 202 desires to access the trained model 218 to receive a predictive output, the client computing system 202 can transmit to the URL a request that includes the input data. The predictive modeling server system 206 receives the input data and prediction request from the client computing system 202 (Step 414). In response, the input data is input to the trained model 218 and a predictive output generated by the trained model (Step 416). The predictive output is provided; it can be provided to the client computing system (Step 418).

In some implementations, where the client computing system is provided with a URL to access the trained model, input data and a request to the URL can be embedded in an HTML document, e.g., a webpage. In one example, JavaScript can be used to include the request to the URL in the HTML document. Referring again to the illustrative example above, when a customer is browsing on the client computing system's web-based online shopping service, a call to the URL can be embedded in a webpage that is provided to the customer. The input data can be the particular customer's online shopping transaction history. Code included in the webpage can retrieve the input data for the customer, which input data can be packaged into a request that is sent in a request to the URL for a predictive output. In response to the request, the input data is input to the trained model and a predictive output is generated. The predictive output is provided directly to the customer's computer or can be returned to the client computer system, which can then forward the output to the customer's computer. The client computing system 202 can use and/or present the predictive output result as desired by the client entity. In this particular example, the predictive output is a prediction of the type of product the customer is most likely to be interested in purchasing. If the predictive output is "blender", then, by way of example, an HTML document executing on the customer's computer may include code that in response to receiving the predictive output cause to display on the customer's computer one or more images and/or descriptions of blenders available for sale on the client computing system's online shopping service. This integration is simple for the client computing system, because the interaction with the predictive modeling server system can use a standard HTTP protocol, e.g. GET or POST can be used to make a request to a URL that returns a JSON (JavaScript Object Notation) encoded output. The input data also can be provided in JSON format.

The customer using the customer computer can be unaware of these operations, which occur in the background without necessarily requiring any interaction from the customer. Advantageously, the request to the trained model can seamlessly be incorporated into the client computer system's web-based application, in this example an online shopping service. A predictive output can be generated for and received at the client computing system (which in this example includes the customer's computer), without expending client computing system resources to generate the output.

In other implementations, the client computing system can use code (provided by the client computing system or otherwise) that is configured to make a request to the predictive modeling server system 206 to generate a predictive output using the trained model 218. By way of example, the code can be a command line program (e.g., using cURL) or a program written in a compiled language (e.g., C, C++, Java) or an interpreted language (e.g., Python). In some implementations, the trained model can be made accessible to the client computing system or other computer platforms by an API through a hosted development and execution platform, e.g., Google App Engine.

In the implementations described above, the trained model 218 is hosted by the predictive modeling server system 206 and can reside and execute on a computer at a location remote from the client computing system 202. However, in some implementations, once a predictive model has been selected and trained, the client entity may desire to download the trained model to the client computing system 202. The client entity may wish to generate and deliver predictive outputs on the client's own computing system. Accordingly, in some implementations, the trained model 218 is provided to a client computing system 202, and can be used locally by the client entity.

Components of the client computing system 202 and/or the predictive modeling system 206, e.g., the model training module 212, model selection module 210 and trained model 218, can be realized by instructions that upon execution cause one or more computers to carry out the operations described above. Such instructions can comprise, for example, interpreted instructions, such as script instructions, e.g., JavaScript or ECMAScript instructions, or executable code, or other instructions stored in a computer readable medium. The components of the client computing system 202 and/or the predictive modeling system 206 can be implemented in multiple computers distributed over a network, such as a server farm, in one or more locations, or can be implemented in a single computer device.

As discussed above, the predictive modeling server system 206 can be implemented "in the cloud". In some implementations, the predictive modeling server system 206 provides a web-based service. A web page at a URL provided by the predictive modeling server system 206 can be accessed by the client computing system 202. An operator of the client computing system 202 can follow instructions displayed on the web page to upload training data "to the cloud", i.e., to the predictive modeling server system 206. Once completed, the operator can enter an input to initiate the training and selecting operations to be performed "in the cloud", i.e., by the predictive modeling server system 206, or these operations can be automatically initiated in response to the training data having been uploaded.

The operator of the client computing system 202 can access the one or more trained models that are available to the client computing system 202 from the web page. For example, if more than one sets of training data had been uploaded by the client computing system 202, then more than one trained predictive models may be available to the particular client computing system. Representations of the available predictive models can be displayed, for example, by names listed in a drop down menu or by icons displayed on the web page, although other representations can be used. The operator can select one of the available predictive models, e.g., by clicking on the name or icon. In response, a second web page (e.g., a form) can be displayed that prompts the operator to upload input data that can be used by the selected trained model to provide predictive output data (in some implementations, the form can be part of the first web page described above). For example, an input field can be provided, and the operator can enter the input data into the field. The operator may also be able to select and upload a file (or files) from the client computing system 202 to the predictive modeling server system 206 using the form, where the file or files contain the input data. In response, the selected predicted model can generate predictive output based on the input data provided, and provide the predictive output to the client computing system 202 either on the same web page or a different web page. The predictive output can be provided by displaying the output, providing an output file or otherwise.

In some implementations, the client computing system 202 can grant permission to one or more other client computing systems to access one or more of the available trained predictive models of the client computing system, which is described in more detail below. The web page used by the operator of the client computing system 202 to access the one or more available trained predictive models can be used (either directly or indirectly as a link to another web page) by the operator to enter information identifying the one or more other client computing systems being granted access and possibly specifying limits on their accessibility. Conversely, if the client computing system 202 has been granted access by a third party (i.e., an entity controlling a different client computing system) to access one or more of the third party's trained models, the operator of the client computing system 202 can access the third party's trained models using the web page in the same manner as accessing the client computing system's own trained models (e.g., by selecting from a drop down menu or clicking an icon).

In some implementations, as is described in more detail below, the operator of the client computing system 202 can use a web page provided by the predictive modeling server system 206 to browse a collection of trained models that are available for use by the client computing system 202 that were trained using training data provided by a third party (i.e., by a different client computing system). The third party that provided the training data would have given permission for the third party's trained model to be included in the collection of trained models that can be browsed. The operator of the client computing system 202 can select to license for use (i.e., rent) a trained model from the collection, typically in exchange for a fee.

The predictive modeling server system 206 can serve multiple client computing systems in addition to the client computing system 202 shown, as has been described above. The predictive modeling server system 206 can therefore accumulate multiple trained models in addition to the trained model 218. In some implementations, the predictive modeling server system 206 can provide a marketplace for the trained models, as mentioned above. That is, the trained model 218 may be used to generate a predictive output from input data that is received from a different client computing system than the client computing system 202 that provided the training data to train the model. By way of illustrative example, consider a scenario where the client computing system 202 provides training data that includes records describing credit card holders' payment histories. The predictive modeling server system 206 trains multiple models and selects a trained model using the training data. The client computing system 202 uses the trained model to provide input data that includes the credit card payment history of a credit card holder and a request for an output that predicts whether the credit card holder will default on a next payment. In this example, the client computing system 202 may be owned and operated by a credit card company or a crediting rating company. A different credit card company or crediting rating company may also have a need for the same type of predictive output from the same type of input data, i.e., the credit card payment history of a credit card holder.

The trained model 218 can be offered for use by other client computing systems in exchange for a fee. In one example, a licensing fee is charged on a pay-per-use basis. In another example, a flat-rate licensing fee is charged for unlimited use for a specified time period. Other fee arrangements are possible, and these are but a couple of examples. Before a trained model 218 is offered for use by other client computing systems, permission can be sought and granted by the client entity (e.g., the owner of the client computing system 202) that provided the training data.

The trained model 218 can be maintained and executed by the predictive modeling server system 206, and access to the trained model 218 can be provided to the one or more additional client computing systems (referred to as the licensee-client computing systems) in the same manner as access is provided to the client computing system 202. The licensee-client computing systems provide input data and a request for a predictive output to the trained model and receive the predictive output in response. The licensee-client computing systems therefore do not have access to the training data that was provided by the client computing system 202, and therefore any private information that was used for training remains private.

Security, access control to limit access to the licensees of the trained model, accounting and collection of fee can be implemented using any convenient conventional technique of electronic commerce. In some implementations, a catalogue of available trained models is provided, which includes descriptions of the type of input data received by each model and the type of predictive output generated in response. The operator of a licensee-client computing system can decide which trained model to use. In other implementations, the licensee-client computing system simply provides the input data and request for a predictive output of a certain type to the predictive modeling system, and a trained model is automatically selected and used to generate the predictive output.

Fees generated by licensing the trained model 218 can be paid to the owner of the predictive modeling server system 206, the client entity that provided the training data (e.g., the owner of the client computing system 202) or otherwise apportioned between the two.

In other implementations, a third party can operate between the predictive modeling server system 206 and the licensee-client computing systems, in exchange for some or all of the fees generated by licensing the trained model. For example, the third party can coordinate receiving requests for predictive outputs and the corresponding input data, and providing the predictive outputs in response. The third party may market the various trained models that are available, and handle the ensuing transactions when licensee-client computing systems pay to use the trained models.

In some implementations, a licensee-client computing system provides input data and request for a predictive output, and the input data is input into multiple trained models. The predictive outputs from the multiple trained models can be combined (e.g., averaged) to generate the predictive output provided to the licensee-client computing system. A fee paid by the licensee-client computing system can be apportioned to more than one party, based on the particular trained models that were used.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
   one or more computers;
   one or more data storage devices coupled to the one or more computers;
   the one or more data storage devices storing a repository of training functions and further storing instructions that, when executed by the one or more computers, cause the one or more computers to perform operations comprising:
   receiving over a network predictive modeling training data from a client computing system;
   using the training data and a plurality of training functions obtained from the repository to train a plurality of predictive models, wherein the plurality of training functions includes two or more training functions for training predictive models of a same type, and wherein predictive models of the same type are trained with different hyper-parameter configurations;
   generating a score for each of the plurality of trained predictive models, where each score represents an estimation of the effectiveness of the respective trained predictive model;
   selecting a first trained predictive model from among the plurality of trained predictive models based on the generated scores; and
   providing access to the first trained predictive model over the network.

2. The system of claim 1, wherein:
   using the training data to train each of the plurality of predictive models and generating a score for each of the plurality of trained predictive models comprises partitioning the training data into k partitions, performing k-fold cross-validation and generating a cross-validation score for each of the plurality of trained predictive models that indicates the accuracy of the trained predictive model, where k is an integer greater than 1.

3. The system of claim 2, wherein providing access to the first trained predictive model comprises providing access to the first trained predictive model trained with all k partitions of the training data.

4. The system of claim 1, where the operations further comprise:
   receiving input data, data identifying the first trained predictive model, and a request for a predictive output; and
   generating the predictive output using the first trained predictive model and the input data.

5. The system of claim 1, wherein providing access to the first trained predictive model comprises providing a universal resource locator (URL) to that identifies the first trained predictive model as an addressable resource.

6. The system of claim 1, wherein the operations further comprise:
   receiving over the network a training request over an HTTP connection at a universal resource locator (URL) address.

7. The system of claim 1, wherein generating a score for each of the plurality of trained predictive models includes generating an estimate of resource usage costs for each of the plurality of trained predictive models and generating the score based at least in part on the estimates.

8. The system of claim 1, wherein the training data comprises at least a gigabyte of training data.

9. The system of claim 1, wherein the training data comprises at least a terabyte of training data.

10. The system of claim 1, wherein the plurality of trained predictive models includes a Naïve Bayes model.

11. The system of claim 1, wherein the plurality of trained predictive models includes a Perceptron model.

12. The system of claim 1, wherein the plurality of trained predictive models includes a Support Vector Machine model.

13. The system of claim 1, wherein the plurality of trained predictive models includes a linear regression model.

14. The system of claim 1, wherein the plurality of trained predictive models includes a logistic regression model.

15. The system of claim 1, wherein the plurality of trained predictive models includes a k-nearest neighbor model.

16. A system comprising:
one or more computers;
one or more data storage devices coupled to the one or more computers,
the one or more data storage devices storing a repository of training functions and further storing instructions that, when executed by the one or more computers, cause the one or more computers to perform operations comprising:
receiving over a network a plurality of sets of predictive modeling training data from a first plurality of client computing systems;
for each set of predictive modeling training data:
using the training data and a plurality of training functions obtained from the repository to train a plurality of predictive models;
generating a score for each of the plurality of trained predictive models, wherein the score represents an estimation of the effectiveness of the respective trained predictive model; and
selecting a trained predictive model from among the plurality of trained predictive models based on the generated scores;
providing access to the plurality of trained predictive models over the network; and
receiving data from a first client computing system of the first plurality of client computing systems indicating that permission is granted to a second client computing system of a second plurality of client computing systems for the second client computing system to access the selected trained predictive model that was trained using training data received from the first client computing system.

17. A computer-implemented method comprising:
receiving over a network predictive modeling training data from a client computing system;
using the training data and a plurality of training functions obtained from a repository of training functions to train a plurality of predictive models, wherein the plurality of training functions includes two or more training functions for training predictive models of a same type, and wherein predictive models of the same type are trained with different hyper-parameter configurations;
generating a score for each of the plurality of trained predictive models, where each score represents an estimation of the effectiveness of the respective trained predictive model;
selecting a first trained predictive model from among the plurality of trained predictive models based on the generated scores; and
providing access to the first trained predictive model over the network.

18. The method of claim 17, wherein:
using the training data to train each of the plurality of predictive models and generating a score for each of the plurality of trained predictive models comprises partitioning the training data into k partitions, performing k-fold cross-validation and generating a cross-validation score for each of the plurality of trained predictive models that indicates the accuracy of the trained predictive model, where k is an integer greater than 1.

19. The method of claim 18, wherein providing access to the first trained predictive model comprises providing access to the first trained predictive model trained with all k partitions of the training data.

20. The method of claim 17, further comprising:
receiving input data, data identifying the first trained predictive model, and a request for a predictive output; and
generating the predictive output using the first trained predictive model and the input data.

21. The method of claim 17, wherein providing access to the first trained predictive model comprises providing a universal resource locator (URL) that identifies the first trained predictive model as an addressable resource.

22. The method of claim 17, wherein generating a score for each of the plurality of trained predictive models includes generating an estimate of resource usage costs for each of the plurality of trained predictive models and generating the score based at least in part on the estimates.

23. A non-transitory computer-readable storage device encoded with instructions which, when executed by one or more computers, cause the one or more computers to perform operations comprising:
receiving over a network predictive modeling training data from a client computing system;
using the training data and a plurality of training functions obtained from a repository of training functions to train a plurality of predictive models, wherein the plurality of training
functions includes two or more training functions for training predictive models of a same type, and wherein predictive models of the same type are trained with different hyper-parameter configurations;
generating a score for each of the plurality of trained predictive models, where each score represents an estimation of the effectiveness of the respective trained predictive model;
selecting a first trained predictive model from among the plurality of trained predictive models based on the generated scores; and
providing access to the first trained predictive model over the network.

24. The non-transitory computer-readable storage device of claim 23, wherein:
using the training data to train each of the plurality of predictive models and generating a score for each of the plurality of trained predictive models comprises partitioning the training
data into k partitions, performing k-fold cross-validation and generating a cross-validation score for each of the plurality of trained predictive models that indicates the accuracy of the trained predictive model, where k is an integer greater than 1.

25. The non-transitory computer-readable storage device of claim 24, wherein providing access to the first trained predictive model comprises providing access to the first trained predictive model trained with all k partitions of the training data.

26. The non-transitory computer-readable storage device of claim 23, wherein the operations further comprise:
receiving input data, data identifying the first trained predictive model, and a request for a predictive output; and
generating the predictive output using the first trained predictive model and the input data.

27. The non-transitory computer-readable storage device of claim 23, wherein providing access to the first trained predictive model comprises providing a universal resource locator (URL) that identifies the first trained predictive model as an addressable resource.

28. The non-transitory computer-readable storage device of claim 23, wherein generating a score for each of the plurality of trained predictive models includes generating an estimate of resource usage costs for each of the plurality of trained predictive models and generating the score based at least in part on the estimates.

29. A computer-implemented method comprising:
receiving over a network a plurality of sets of predictive modeling training data from a first plurality of client computing systems;
for each set of predictive modeling training data:
using the training data and a plurality of training functions obtained from a repository of training functions to train a plurality of predictive models;
generating a score for each of the plurality of trained predictive models, wherein the score represents an estimation of the effectiveness of the respective trained predictive model; and
selecting a trained predictive model from among the plurality of trained predictive models based on the generated scores;
providing access to the plurality of trained predictive models over the network; and
receiving data from a first client computing system of the first plurality of client computing systems indicating that permission is granted to a second client computing system of a second plurality of client computing systems for the second client computing system to access the selected trained predictive model that was trained using training data received from the first client computing system.

30. A non-transitory computer-readable storage device encoded with instructions which, when executed by one or more computers, cause the one or more computers to perform operations comprising:
receiving over a network a plurality of sets of predictive modeling training data from a first plurality of client computing systems;
for each set of predictive modeling training data:
using the training data and a plurality of training functions obtained from a repository of training functions to train a plurality of predictive models;
generating a score for each of the plurality of trained predictive models, wherein the score represents an estimation of the effectiveness of the respective trained predictive model; and
selecting a trained predictive model from among the plurality of trained predictive models based on the generated scores;
providing access to the plurality of trained predictive models over the network; and
receiving data from a first client computing system of the first plurality of client computing systems indicating that permission is granted to a second client computing system of a second plurality of client computing systems for the second client computing system to access the selected trained predictive model that was trained using training data received from the first client computing system.

* * * * *